United States Patent
Wolleschensky et al.

(10) Patent No.: US 7,271,897 B2
(45) Date of Patent: Sep. 18, 2007

(54) METHOD FOR INCREASING THE SPECTRAL AND SPATIAL RESOLUTION OF DETECTORS

(75) Inventors: Ralf Wolleschensky, Schoeten (DE); Gunter Moehler, Jena (DE); Volker Gerstner, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 11/182,465

(22) Filed: Jul. 15, 2005

(65) Prior Publication Data

US 2006/0000984 A1    Jan. 5, 2006

Related U.S. Application Data

(63) Continuation of application No. 09/924,268, filed on Aug. 7, 2001, now Pat. No. 6,947,133.

(60) Provisional application No. 60/230,343, filed on Sep. 6, 2000.

(30) Foreign Application Priority Data

Aug. 8, 2000    (DE) ................ 100 38 528

(51) Int. Cl.
*G01J 3/30* (2006.01)
*G01N 21/00* (2006.01)

(52) U.S. Cl. ........................ 356/317; 356/73

(58) Field of Classification Search .................. None
See application file for complete search history.

(56) References Cited

U.S. PATENT DOCUMENTS

| 5,936,731 | A * | 8/1999 | Cabib et al. ............. 356/456 |
| 5,949,914 | A * | 9/1999 | Yuen ...................... 382/254 |
| 6,240,219 | B1* | 5/2001 | Gregory ................. 382/321 |
| 6,337,472 | B1* | 1/2002 | Garner et al. ........... 250/201.3 |
| 6,459,823 | B2* | 10/2002 | Altunbasak et al. ...... 382/299 |
| 6,947,133 | B2* | 9/2005 | Wolleschensky et al. ... 356/317 |

FOREIGN PATENT DOCUMENTS

EP    320530 A1 *    6/1989

* cited by examiner

*Primary Examiner*—Gregory J. Toatley, Jr.
*Assistant Examiner*—Gordon J. Stock, Jr.
(74) *Attorney, Agent, or Firm*—Reed Smith LLP

(57) ABSTRACT

A method of optical detection of characteristic quantities of an illuminated specimen comprising detecting a signal that is backscattered, reflected and/or fluoresced and/or transmitted from the specimen by a spatially resolving detector wherein radiation coming from the specimen is imaged on the detector, shifting the position of the radiation which is measured in a spatially resolved manner relative to the detector and determining intermediate values by an algorithm from the signals measured in different shifts for purposes of increasing the spatial resolution of the detector. An arrangement for performing the method is also disclosed.

5 Claims, 13 Drawing Sheets

Example of detector unit / optics construction for line scanner

Typical spectra with ratiometric measurements:
a) a dye with emission ratio;
b) two dyes with ion-dependent signals FIG. 5. Block diagram of detector-optics construction FIG. 6. Example of detector unit / optics construction FIG. 7. Block diagram of detector unit / optics construction for line scanner F I G. 8. Example of detector unit / optics construction for line scanner FIG. 9. Switching Elements FIG. 10. Algorithm Pixelshift (top) and calculated sub-pixels (bottom)

FIG. 12. Example for construction of electronics

METHOD FOR INCREASING THE SPECTRAL AND SPATIAL RESOLUTION OF DETECTORS

CROSS-REFERENCE TO RELATED APPLICATIONS

This application is a continuation application of U.S. patent application Ser. No. 09/924,268 filed Aug. 7, 2001 now U.S. Pat. No. 6,947,133, which claims priority of provisional application Ser. No. 60/230,343, filed Sep. 6, 2000 and German Application No. 100 38 528.1, filed Aug. 8, 2000, the complete disclosures of which are hereby incorporated by reference.

BACKGROUND OF THE INVENTION a) Field of the Invention

The invention is directed to a method and an arrangement in fluorescence microscopy, particularly laser scanning microscopy, fluorescence correlation spectroscopy, and nearfield scanning microscopy, for examination of predominantly biological specimens, preparations and associated components. This includes methods for screening active ingredients based on fluorescence detection (high throughput screening). The transition from the detection of a few broad-spectrum dye bands to the simultaneous acquisition of whole spectra opens up new possibilities for the identification, separation and allocation of mostly analytic or functional specimen characteristics to spatial partial structures or dynamic processes. Therefore, simultaneous examination of specimens with multiple fluorophores with overlapping fluorescence spectra are even possible in three-dimensional or spatial structures of thick specimens. The spectral and spatial resolution of the detection unit is increased by means of the arrangement.

b) Description of the Related Art

A typical area of application of light microscopy for examining biological preparations is fluorescence microscopy (Pawley, "Handbook of Biological Confocal Microscopy"; Plenum Press 1995). In this case, determined dyes are used for specific labeling of cell parts.

The irradiated photons having a determined energy excite the dye molecules, through the absorption of a photon, from the ground state to an excited state. This excitation is usually referred to as one-photon or single-photon absorption (FIG. 1a). The dye molecules excited in this way can return to the ground state in various ways. In fluorescence microscopy, the most important is the transition with emission of a fluorescence photon. Because of the Stokes shift, there is generally a red shift in the wavelength of the emitted photon in comparison to the excitation radiation; that is, it has a greater wavelength. Stokes shift makes it possible to separate the fluorescence radiation from the excitation radiation.

The fluorescent light is split off from the excitation radiation by suitable dichroic beam splitters in combination with blocking filters and is observed separately. This makes it possible to show individual cell parts that are dyed with different dyes. In principle, however, several parts of a preparation can also be dyed simultaneously with different dyes which bind in a specific manner (multiple fluorescence). Special dichroic beam splitters are used again to distinguish the fluorescence signals emitted by the individual dyes.

In addition to excitation of dye molecules with a high-energy photon (single-photon absorption), excitation with a plurality of low-energy photons is also possible (FIG. 1b). The sum of energies of the single photons corresponds approximately to a multiple of the high-energy photon. This type of excitation of dyes is known as multiphoton absorption (Corle, Kino, "Confocal Scanning, Optical Microscopy and Related Imaging Systems"; Academic Press 1996). However, the dye emission is not influenced by this type of excitation, i.e., the emission spectrum undergoes a negative Stokes shift in multiphoton absorption; that is, it has a smaller wavelength compared to the excitation radiation. The separation of the excitation radiation from the emission radiation is carried out in the same way as in single-photon excitation.

The prior art will be explained more fully in the following by way of example with reference to a confocal laser scanning microscope (LSM) (FIG. 2).

An LSM is essentially composed of four modules: light source, scan module, detection unit and microscope. These modules are described more fully in the following. In addition, reference is had to DE19702753A1.

Lasers with different wavelengths are used in an LSM for specific excitation of different dyes in a preparation. The choice of excitation wavelengths is governed by the absorption characteristics of the dyes to be examined. The excitation radiation is generated in the light source module. Various lasers (argon, argon/krypton, Ti:Sa lasers) are used for this purpose. Further, the selection of wavelengths and the adjustment of the intensity of the required excitation wavelength is carried out in the light source module, e.g., using an acousto-optic crystal. The laser radiation subsequently reaches the scan module via a fiber or a suitable mirror arrangement.

The laser (Laser A-D) radiation generated in the light source is focused in the preparation in a diffraction-limited manner by means of the objective (2) via the scanner, scanning optics and tube lens. The focus scans the specimen in a point raster in x-y direction. The pixel dwell times when scanning over the specimen are mostly in the range of less than one microsecond to several seconds.

In confocal detection (descanned detection) of fluorescent light, the light emitted from the focal plane (specimen) and from the planes located above and below the latter reaches a dichroic beam splitter (MDB) via the scanner. This dichroic beam splitter separates the fluorescent light from the excitation light. The fluorescent light is subsequently focused on a diaphragm (confocal diaphragm/pinhole) located precisely in a plane conjugate to the focal plane. In this way, fluorescent light components outside of the focus are suppressed. The optical resolution of the microscope can be adjusted by varying the size of the diaphragm. Another dichroic blocking filter (EF(1-5)) which again suppresses the excitation radiation is located behind the diaphragm. After passing the blocking filter, the fluorescent light is measured by means of a point detector (PMT1-5).

When using multiphoton absorption, the excitation of the dye fluorescence is carried out in a small volume at which the excitation intensity is particularly high. This area is only negligibly larger than the detected area when using a confocal arrangement. Accordingly, a confocal diaphragm can be dispensed with and detection can be carried out directly following the objective (non-descanned detection).

In another arrangement for detecting a dye fluorescence excited by multiphoton absorption, descanned detection is carried out again, but this time the pupil of the objective is imaged in the detection unit (nonconfocal descanned detection).

From a three-dimensionally illuminated image, only the plane (optical section or slice) located in the focal plane of the objective is reproduced by the two detection arrangements in connection with corresponding single-photon absorption or multiphoton absorption. By recording or plotting a plurality of optical slices in the x-y plane at different depths z of the specimen, a three-dimensional image of the specimen can be generated subsequently in computer-assisted manner.

Accordingly, the LSM is suitable for examination of thick preparations. The excitation wavelengths are determined by the utilized dye with its specific absorption characteristics. Dichroic filters adapted to the emission characteristics of the dye ensure that only the fluorescent light emitted by the respective dye will be measured by the point detector.

Currently, in biomedical applications, a number of different cell regions are labeled simultaneously by different dyes (multifluorescence). In the prior art, the individual dyes can be detected separately based on different absorption characteristics or emission characteristics (spectra) (FIG. 3a). For example, emission signals are plotted over wavelength for different dyes (1-4). For separate detection, an additional splitting of the fluorescent light of a plurality of dyes is carried out with the secondary beam splitters (DBS) and a separate detection of the individual dye emissions is carried out in separate point detectors (PMT x). With the arrangement described above, it is impossible for the user to flexibly adapt detection and excitation to corresponding new dye characteristics. Instead, new dichroic beam splitters and blocking filters must be created for every (new) dye. In an arrangement according to WO9507447, the fluorescent light is split spectrally by means of a prism. The method differs from the above-described arrangement with dichroic filters only in that the characteristic of the utilized filter is adjustable. However, it is still preferable to record the emission band of a dye by point detector.

Fast local measurement of the emission spectrum is possible only conditionally with the two arrangements, since the adjustment of the emission range relies on mechanical movements of the dichroic filter and diaphragms and the maximum spectral resolution is therefore limited to some 5 nm. A high spectral resolution is needed, for example, when the emission spectra overlap as is shown in FIG. 3b. FIG. 3b shows behavior of this kind in the two naturally occurring dyes CFP and GFP. These dyes are particularly suited to examination of living preparations because they have no toxic effect on the specimens to be examined.

When the position of the emission spectrum of the utilized dyes is unknown or when a shift occurs in the emission spectrum depending on environment (FIG. 3c), high-resolution detection of the dye fluorescence is necessary. The wavelength shift can amount to several times 10 nm. Spectrometers are also currently used in combination with an LSM to measure the emission spectrum in the specimen. In so doing, a conventional, usually high-resolution spectrometer is used instead of a point detector (Patent: Dixon, et al. U.S. Pat. No. 5,192,980). However, these spectrometers can record an emission spectrum only point by point or as an average over a region. Thus, this is a type of spectroscopy. In addition, the usually weak fluorescence signal of the specimen is distributed to a large quantity of individual channels in the spectrometer (usually 512 or 1024 individual channels) or a narrow fluorescence band is detected corresponding to the spectral resolution. Therefore, the signal per individual channel is extremely small and in some cases is not detectable.

Line scanners, as they are called, are also used according to the prior art in place of point scanners (Corle, Kino, "Confocal Scanning Optical Microscopy and Related Imaging Systems"; Academic Press 1996). The basic construction essentially corresponds to that of an LSM according to FIG. 2. However, instead of a point focus, a line is imaged in the focus and the specimen to be examined is scanned in only one direction. A slit diaphragm is used as confocal diaphragm instead of a pinhole diaphragm in a construction of this kind. Non-descanned detection can also be carried out with this arrangement using multiphoton absorption. The confocal diaphragm can again be omitted in this case. Usually, a CCD line with 1024 or more image points is used for detection. The image acquisition rate is increased considerably by scanning a line instead of a point. This scanning method can accordingly be used for observation of fast-running processes in real time.

It is disadvantageous in the methods according to the prior art that the line detector must usually be read out sequentially, so that increased readout noise can result at fast readout rates.

OBJECT AND SUMMARY OF THE INVENTION

Therefore, the primary object of the invention is novel methods for efficient, spectrally and spatially high-resolution detection of fluorescent dyes. These methods should be usable in image-generating and analytic microscope systems. The microscope systems are image-generating systems such as laser scanning microscopes for three-dimensional examination of biological preparations with an optical spatial resolution of up to 200 nm, nearfield scanning microscopes for high-resolution examination of surfaces with a resolution of up to 10 nm, fluorescence correlation microscopes for quantitative determination of molecular concentrations and for measuring molecular diffusions. Also included are methods based on fluorescence detection for screening dyes.

In all of the systems mentioned above, fluorescent dyes are used for specific labeling of the preparations. The objectives mentioned above are met by methods and arrangements according to the independent patent claims. Preferred further developments are indicated in the dependent claims.

In accordance with the present invention, a method of optical detection of characteristic quantities of an illuminated specimen comprising detecting a signal that is back-scattered, reflected and/or fluoresced and/or transmitted from the specimen by a spatially resolving detector wherein radiation coming from the specimen is imaged on the detector, shifting the position of the radiation which is measured in a spatially resolved manner relative to the detector and determining intermediate values by an algorithm from the signals measured in different shifts for purposes of increasing the spatial resolution of the detector.

DESCRIPTION OF THE PREFERRED EMBODIMENTS

Both methods for increasing spectral and spatial detector resolution are described individually in the following.

Figure 5:
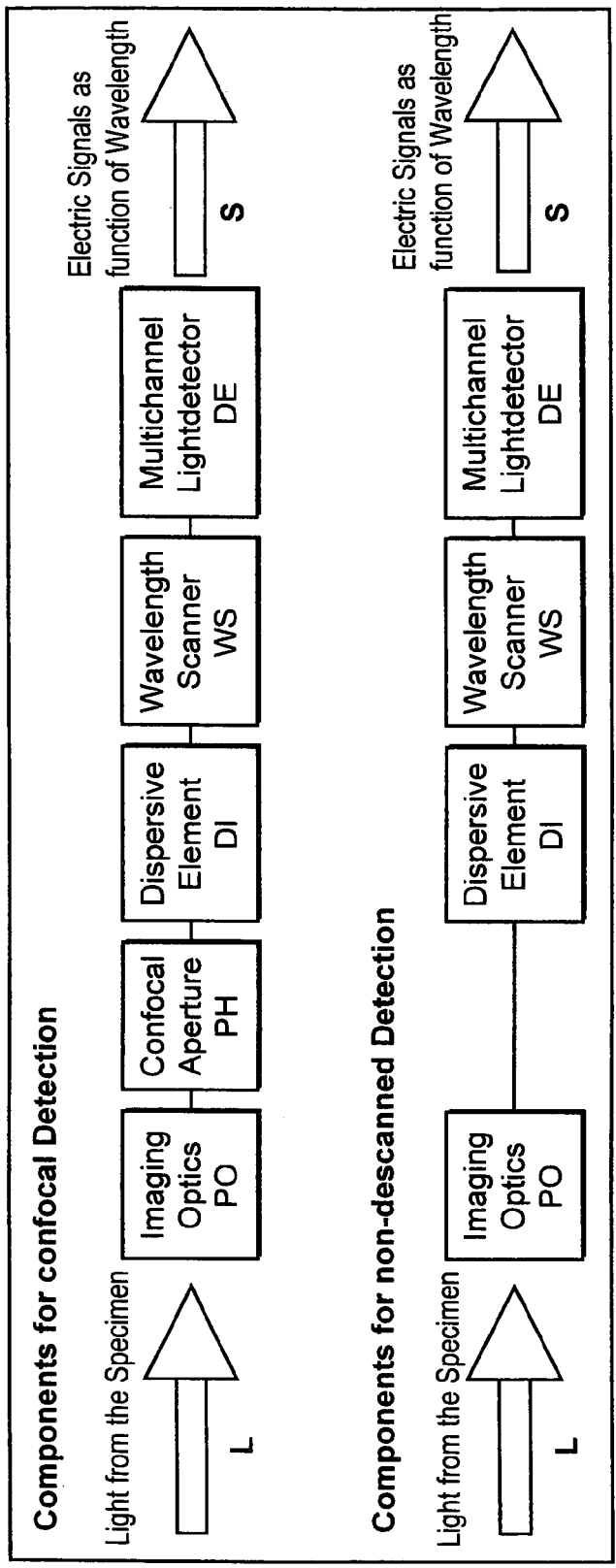
FIG. 5 is a block diagram showing detector-optics construction.
Figure 6:
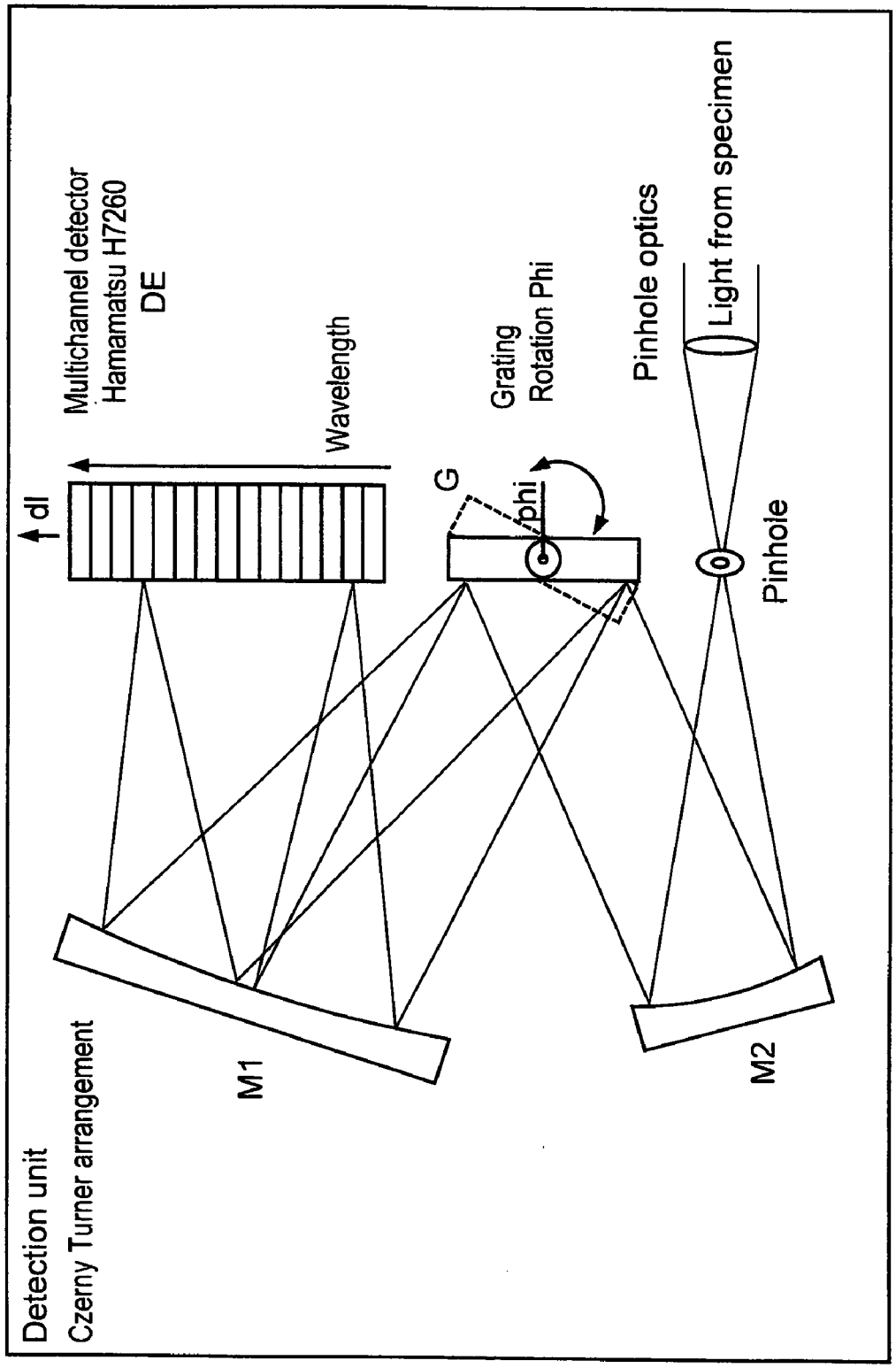
FIG. 6 is a block diagram showing an example of detector unit/optics construction.

The method according to the invention is based on a spectrally split detection of fluorescence. For this purpose, the emission light is split from the excitation light in the scan module or in the microscope (with multiphoton absorption) by means of an element for separating the excitation radiation from the detected radiation, such as the main color splitter (MDB) or an AOTF according to 7346DE or 7323DE. With transmitted-light arrangements, this type of element can also be entirely omitted. A block diagram of the detector unit to be described is shown in FIG. 5. With confocal detection, the light L from the specimen is focused through a diaphragm (pinhole) PH by means of imaging optics PO, so that fluorescence occurring outside of the focus is suppressed. In non-descanned detection, the diaphragm is omitted. The light is now divided into its spectral components by means of an angle-dispersive element DI. The angle-dispersive elements can be prisms, gratings and, e.g., acousto-optic elements. The light which is split into its spectral components by the dispersive element is subsequently imaged on a line detector DE. This line detector DE measures the emission signal S as a function of wavelength and converts it into electrical signals. By means of a wavelength scanner WS according to the invention, which will be described more fully in the following, the position of the fluorescence spectrum relative to the line detector can be shifted in a defined manner by a distance d1 by displacement of the PMT in FIG. 5 or by swiveling a grating or mirror by a rotational angle phi (FIG. 6, among others). In addition, a line filter for suppressing the excitation wavelengths can be arranged in front of the detection unit.

A possible embodiment form of the optical beam path of the detector unit shown in the block diagram in FIG. 5 is shown in FIG. 6. The construction is essentially a Czerny Turner construction. In confocal detection, the light L from the specimen is focused through the confocal diaphragm PH by the pinhole optics PO. With non-descanned detection in case of multiphoton absorption, this diaphragm can be omitted. The first imaging mirror M2 collimates the fluorescent light. Subsequently, the light strikes a line grating G, for example, a grating with a line number of 651 lines per mm. The grating bends the light in different directions corresponding to its wavelength. The second imaging mirror M1 focuses the individual spectrally split wavelength components on the corresponding channels of the line detector DE. The use of a secondary electron multiplier array by Hamamatsu H7260 is especially advantageous. The detector has 32 channels and high sensitivity. The free spectral region of the embodiment form described above is approximately 350 nm. In this arrangement, the free spectral region is uniformly distributed to the 32 channels of the line detector resulting in an optical resolution of approximately 10 nm. Therefore, this arrangement is suitable for spectroscopy only conditionally. However, its use in an image-generating system is advantageous because the signal per detection channel is still relatively large due to the relatively broad detected spectral band. A shift of the fluorescence spectrum can be carried out, for example, by rotating the grating, M1, M2, by angle phi and/or by a displacement of the line receiver in the direction of the wavelength split by d1 (see Figure). This corresponds to an advantageous construction of the above-mentioned wavelength scanner WS.

Figure 2:
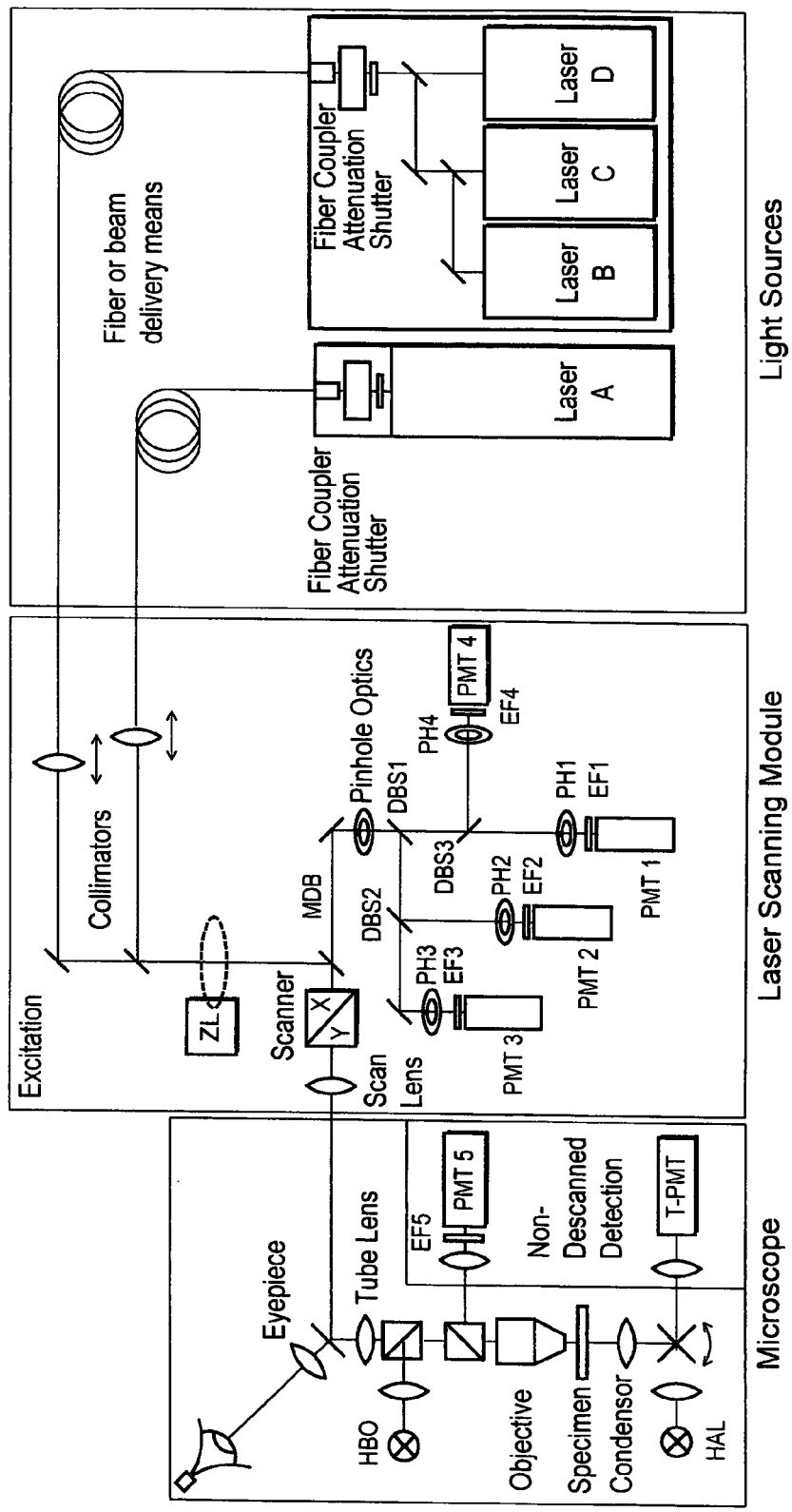
FIG. 2 illustrates a known construction in block diagram form of a confocal laser scanning microscope.
Figure 3:
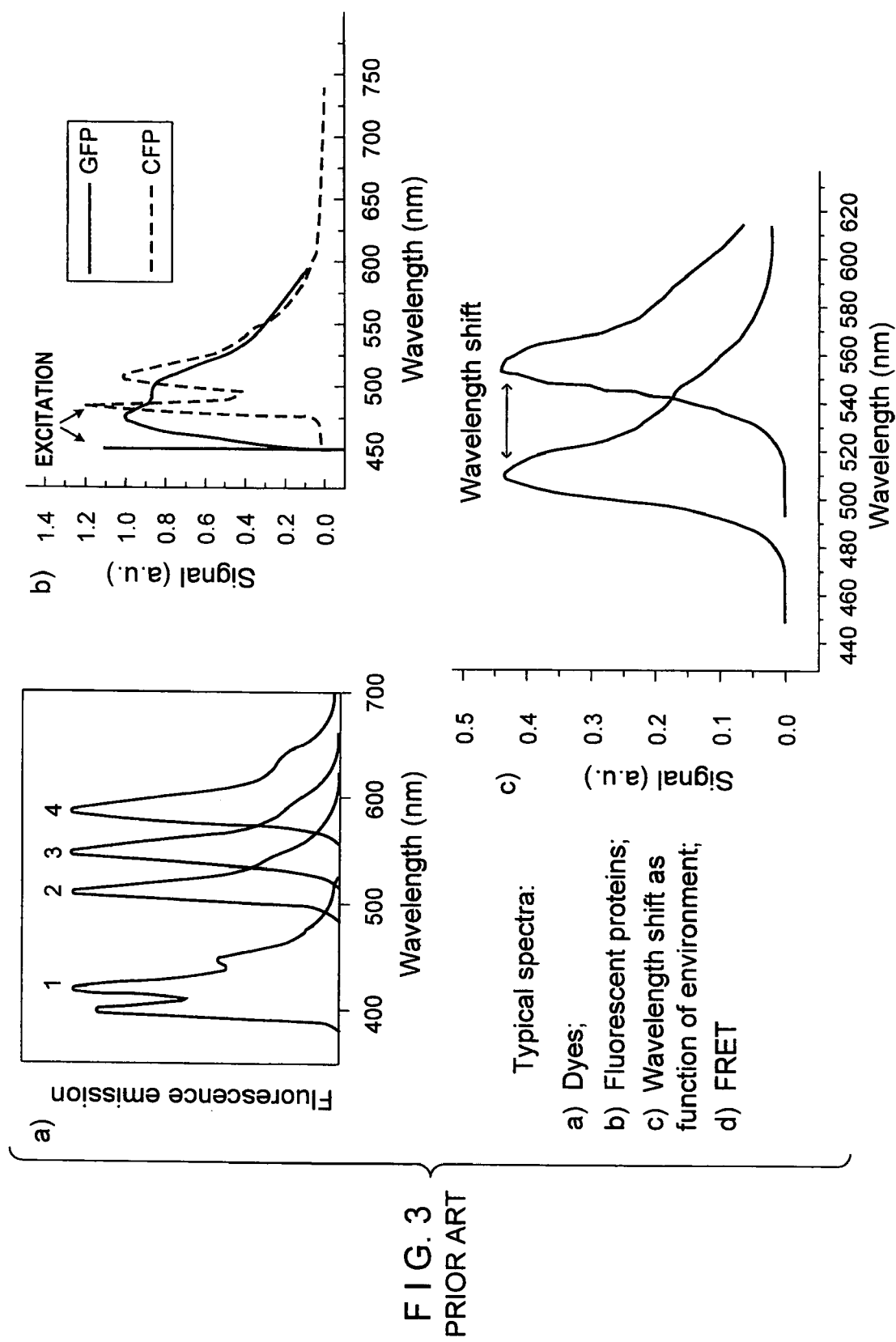
FIGS. 3a, 3b and 3c illustrate typical spectra for a) dyes, b) fluorescent proteins, and c) wavelength shift as a function of environment.
Figure 4:
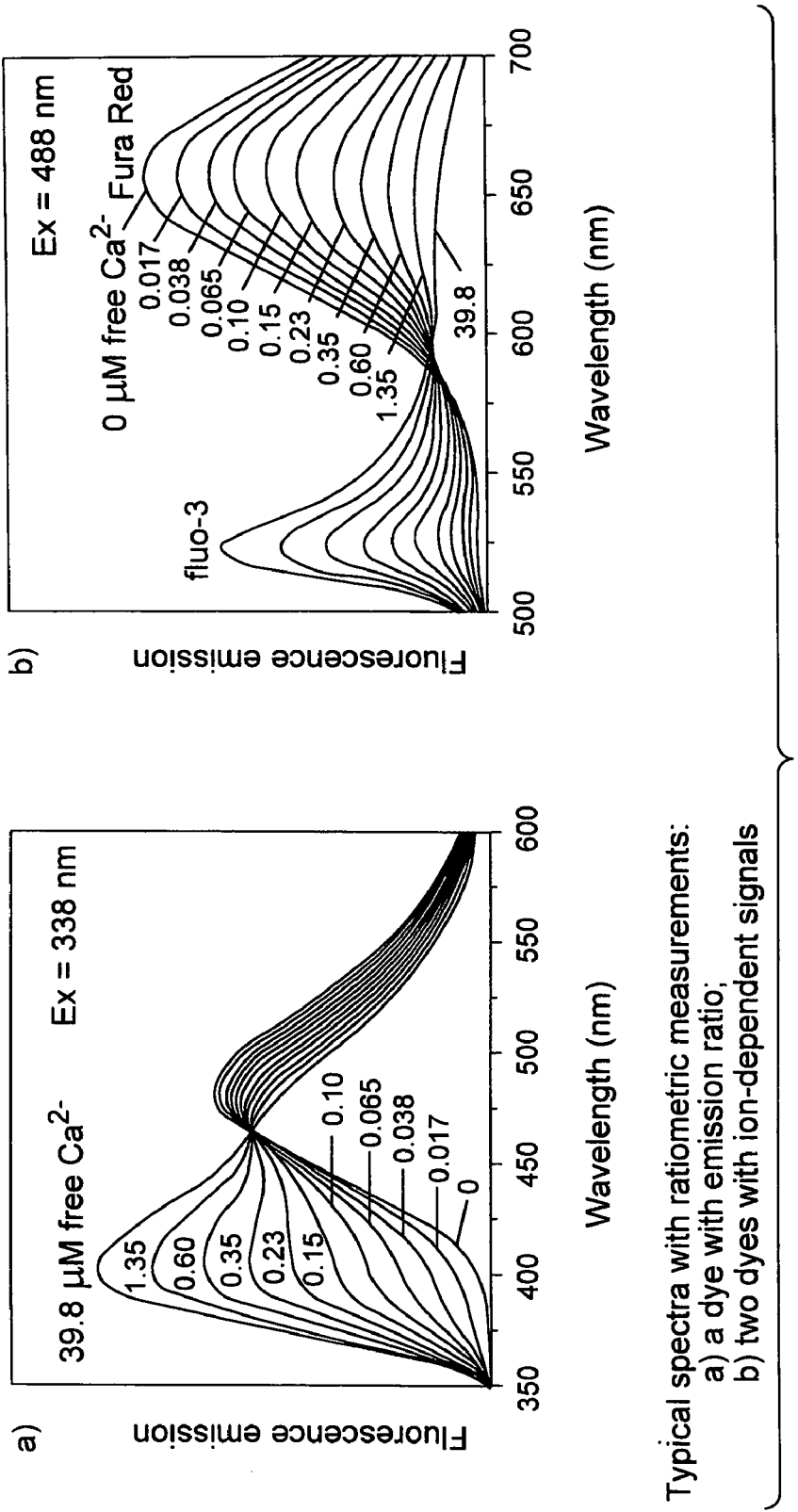
FIGS. 4a and 4b illustrate typical spectra with radiometric measurements.

Another possible embodiment form could consist in the use of a matrix detector (e.g., a CCD matrix). In this case, splitting in the drawing plane into different wavelength components is carried out in a coordinate through the dispersive element G. A complete line (or column) of the descanned image is imaged on the matrix detector in the direction perpendicular to the drawing plane. This embodiment form is particularly advantageous in the construction of a line scanner. The basic construction essentially corresponds to that of an LSM according to FIG. 2. However, instead of a point focus, a line, as shown in dashes, is imaged in the focus, for example, through a cylindrical lens ZL, and the specimen to be examined is scanned in only one direction. A slit diaphragm is used as confocal diaphragm instead of a pinhole diaphragm in a construction of this kind. Non-descanned detection can also be carried out with this arrangement as is shown in FIG. 2, especially when using multiphoton absorption. Further, the slit diaphragm can be omitted with multiphoton absorption.

Figure 7:
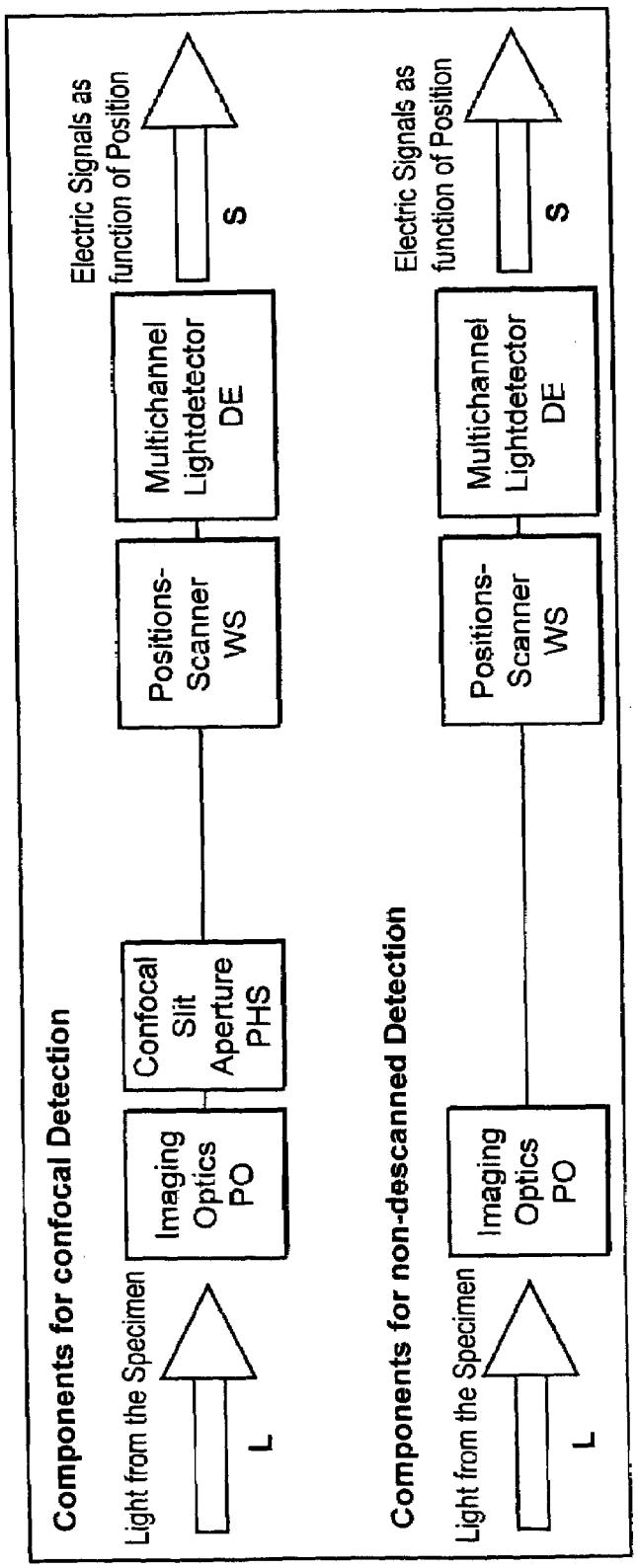
FIG. 7 is a block diagram of detector unit/optics construction for a line scanner.

The method for increasing the spatial resolution of the detector, preferably in a method for real-time image generation, is based on line-type excitation and detection of the specimen (line scanner). The emission light is split from the excitation light in the scan module or in the microscope (with multiphoton absorption), for example, by means of the main color splitter (MDB). A block diagram of the detector unit to be described is shown in FIG. 7. With confocal detection, the light from the specimen is focused through a slit diaphragm PH1 by means of imaging optics PO, so that fluorescence occurring outside of the focus is suppressed. In non-descanned detection, the diaphragm is omitted. The light can now also be imaged on the line detector DE by means of a mirror SP, shown in FIG. 8, which is located in a plane (pupil of the optical illumination arrangement) which is optically conjugated to the scanning mirrors x/y.

In this case, there is no dispersive splitting; rather, a broad-band detection of the fluorescent light is carried out by means of the detection unit, wherein the spatial resolution is realized along the scanning line by means of the detector.

By means of mirror SP, the position of the fluorescence line relative to the line detector can be shifted in a defined manner by d1 (position scanner WS). Thus, this line detector DE measures the emission signal as a function of the position in which the excitation takes place in the specimen and converts it into electrical signals. In addition, a line filter (not shown) for suppressing the excitation wavelengths is advantageously arranged in front of the detection unit. Further, splitting of the fluorescence signals of different dyes by corresponding dichroic filters according to the prior art and separate detection of the fluorescence signals with different detection devices is part of the present invention.

Figure 8:
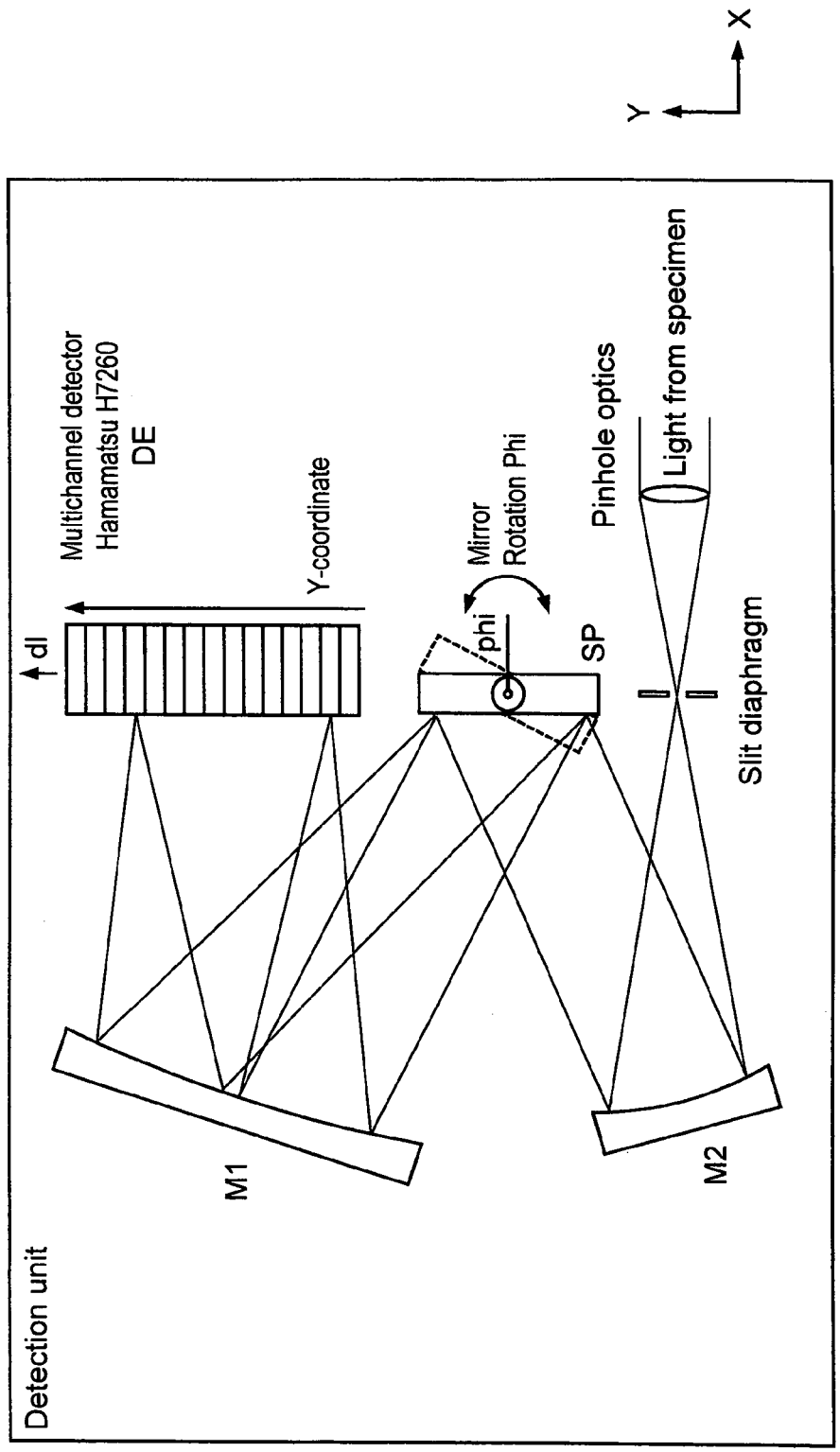
FIG. 8 is an example of the optics of detector unit construction for a line scanner.

A possible embodiment form of the optical beam path of the detector unit shown in the block diagram in FIG. 7 is shown in FIG. 8. With confocal detection, the light L from the specimen is focused through the confocal slit diaphragm PHS by the pinhole optics PO. In non-descanned detection in case of multiphoton absorption, this diaphragm can be omitted. The first imaging mirror M2 collimates the fluorescent light. Subsequently, the light impinges on another plane mirror SP. The mirror SP is located in a pupil of the optical illumination device and is mounted so as to be rotatable. The second imaging mirror M1 focuses the scan line on the corresponding channels of the line detector DE. The use of a secondary electron multiplier array by Hamamatsu H7260 is especially advantageous. The detector has 32 channels and has high sensitivity. Further, the signal per detection channel is still relatively large due to the relatively broad detected line segment. A shift of the scan line can be carried out, for example, by rotation of the mirror SP about an axis vertical to the scan line along the y-coordinate at PMT and parallel to the mirror plane, of M1, of M2 by phi and/or by displacement of the line receiver by d1. This corresponds to the position scanner WS mentioned above. Non-descanned detection, especially using multiphoton absorption, can also be carried out with this arrangement as is shown in FIG. 2. Further, the slit diaphragm can be omitted with multiphoton absorption.

When the scan line lies along the X-axis, for instance, the scanner can take over the position scan WS by d1. In this case, the mirror SP in FIG. 8 would be stationary. In so doing, the scan line is moved in the specimen along the x-axis rather than relative to the detector by means of WS. Both movements are basically identical. In this case, the y-scanner moves the line along the y-axis over the preparation. The functions of the x-axis and y-axis can also be reversed.

Figure 9:
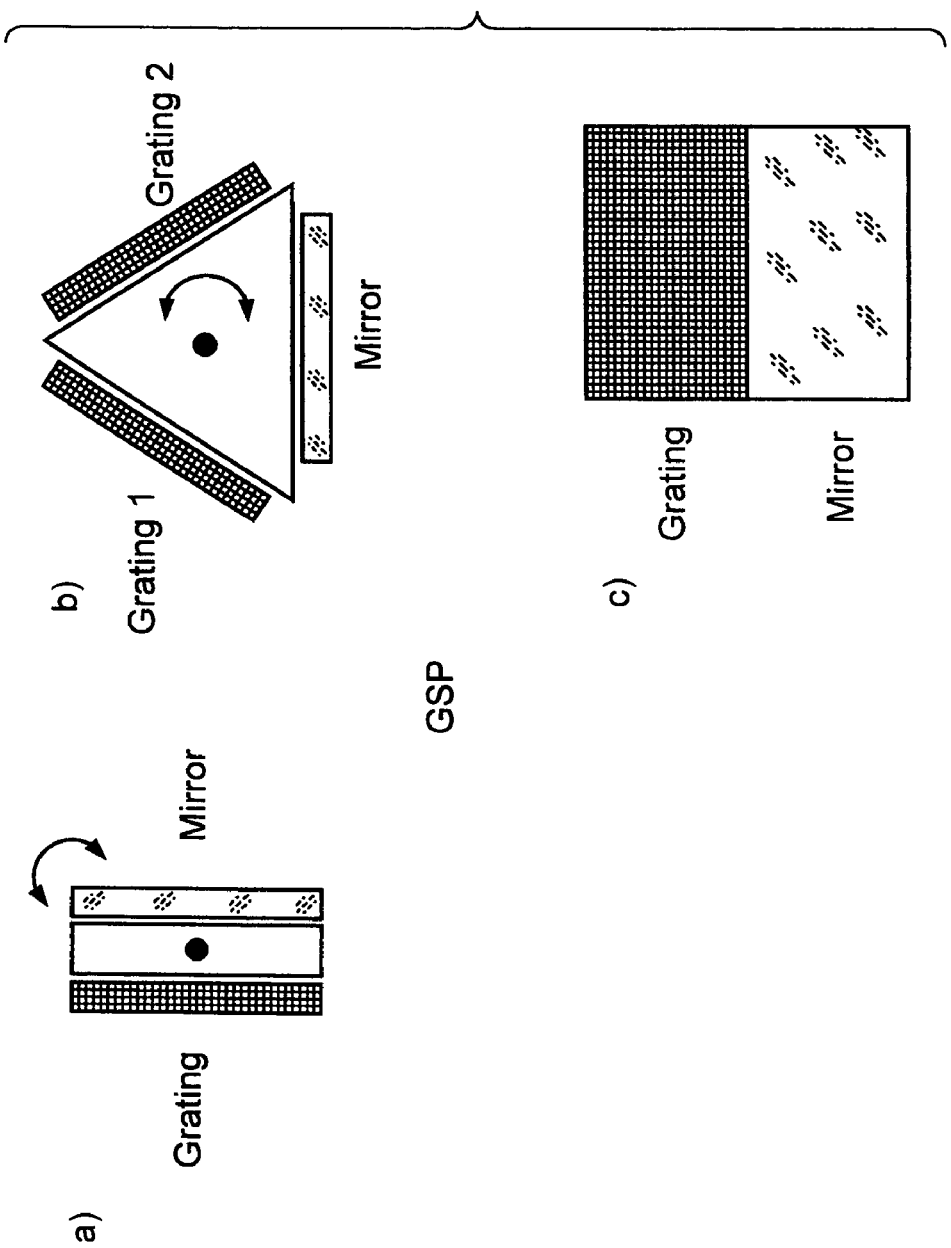
FIGS. 9a, 9b and 9c illustrate switching elements.

The advantage of the latter variant consists in that it is possible to switch between a point-scanning LSM with high spectral resolution (by dispersive splitting according to FIGS. 5 and 6) and a line-scanning with low spectral resolution but with high scanning speed (according to FIGS. 7 and 8), wherein the same detection can be resorted to each time. For this purpose, for example, a switching element at which both optical elements are located is advantageously arranged instead of the mirror or grating. When switching from the point scanner to the line scanner, a cylindrical lens ZL shown in FIG. 2 is introduced into the beam path between MDB and the laser input-coupling in the scan module for forming a scan line, the pinhole is changed to or exchanged for a slit diaphragm, and the mirror SP is rotated in. FIG. 9 shows different arrangements for the construction of the switching element G/SP. FIG. 9a shows a rotatable element on which a mirror is located on the front side and a grating is located on the back. FIG. 9b shows a rotatable arrangement with 2 gratings and a mirror. The potential spectral resolution of the detection unit can be varied by using several gratings. FIG. 9c shows an arrangement in which G/SP is displaced vertically (or horizontally when the arrangement is rotated 90°) and which is fitted with a grating in the top part and a mirror in the bottom part. A combination of the arrangements shown in FIG. 9 is part of the invention without limitation.

In another possible embodiment form, a matrix detector (e.g., a CCD or an 8□8 PMT matrix, Hamamatsu H7546) can be used. This embodiment form is particularly advantageous in the construction of a spectrally high-resolving real-time line scanner. For this purpose, a grating is used again instead of the mirror SP in FIG. 8 and spectrally splits the fluorescent light vertical to the grating lines in the drawing plane and images it along a coordinate of the matrix detector. A complete line (or column) of the scanned image is imaged on the matrix detector in the direction perpendicular to the drawing plane. The scan line is oriented parallel to the grating lines. The rotation of the grating can be carried out about the vertical axis, i.e., perpendicular to the drawing plane, to increase the spectral resolution of the detector. An additional rotation about a horizontal axis which extends in the grating plane and vertical to the grating lines can serve to increase the spatial resolution of the detector in that the scan line is moved over the detector by swiveling the grating.

When the scan line lies along the X-axis, for example, the x-scanner can take over the position scan WS by d1. In this case, the grating in FIG. 8 would preferably be stationary in its horizontal tilt. The y-scanner moves the scan line over the preparation along the y-axis in this case. In another embodiment form, the grating can also remain stationary in its horizontal and vertical tilt. The position scan for increasing the spatial resolution is further carried out by means of the x-scanner. An increase in the spectral resolution of the detector is not carried out in this case. The functions of the x- and y-axes can also be reversed.

The spectral and spatial resolution in the optical arrangements shown above are determined by the size and quantity of individual channels. In the embodiment forms described above, each individual channel detects a spectral band of the emission spectrum with a spectral width of approximately 10 nm. On the other hand, the potential spectral resolution of the spectrometer arrangement ($\Delta\lambda$) is 1.5 nm because of the grating that is used. When the arrangements described above are applied in a line scanner, each individual channel detects the sum of 512/32=16 individual image points with a required pixel resolution of 512 pixels, for example.

Figure 10:
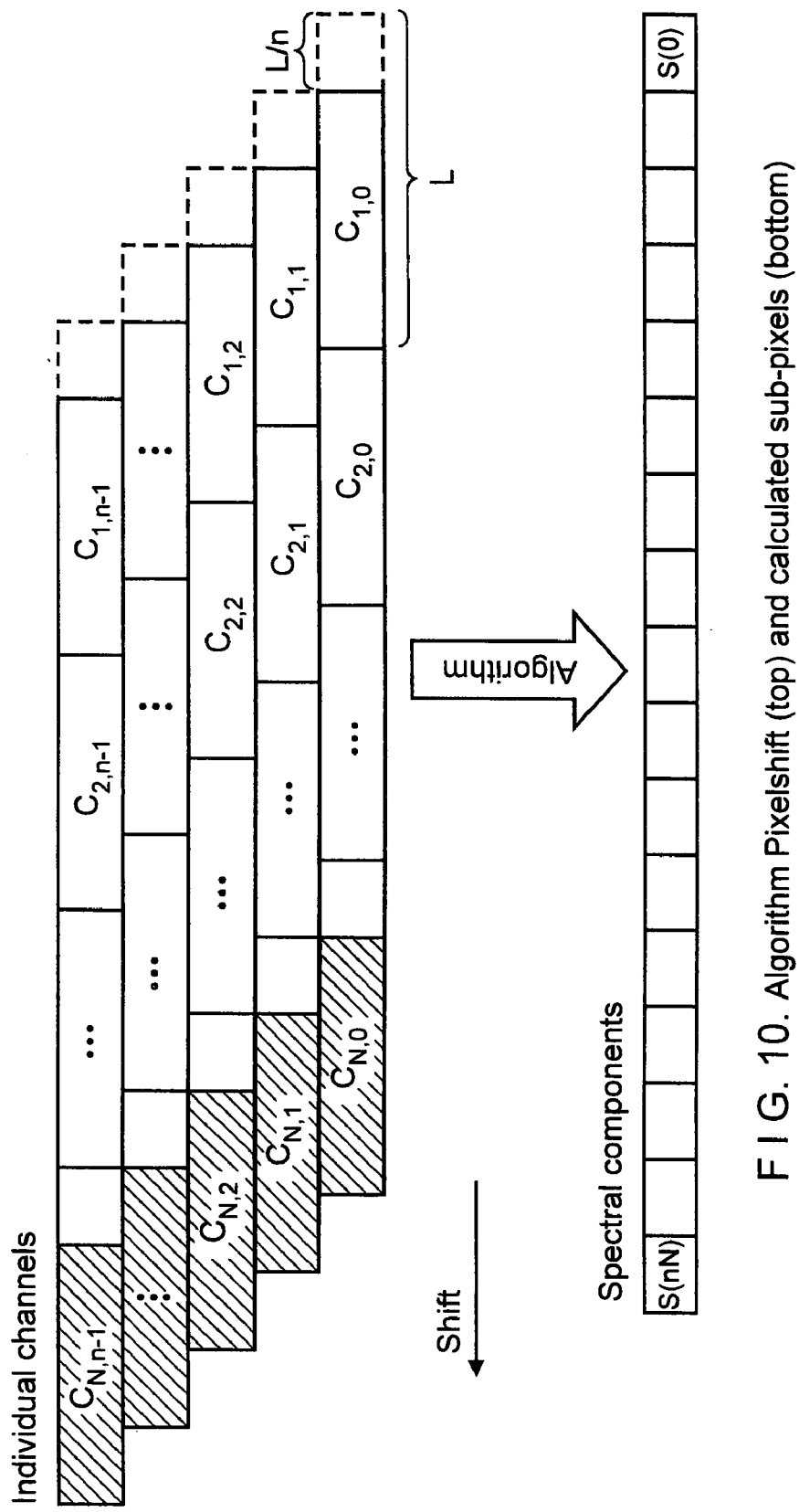
FIG. 10 illustrates an algorithm of a pixel shift and calculated sub-pixels.

In order to increase the spectral and spatial resolution of the detection unit by a factor n, the fluorescence spectrum or the scan line is shifted in n steps by a multiple of L/n in each instance, where L is the width of an individual channel. FIG. 10 shows schematically the different individual channels of the line detector, each in a line, to which N individual signals C correspond. For the line detector H7260 mentioned above, N=332. In the direction of the d1-axis, different positions of the detected signal (emission spectrum or scan line) are shown as a function of the wavelength scanner or position scanner described above. A shift (corresponding to WS) of the fluorescence spectrum or scan line can be carried out, as was already mentioned, by rotating the grating or mirror by an angle phi or by a displacement d1 of the detector.

The measured signals of the individual channels are designated by $c_{kj}$ (shown as blocks in FIG. 10), where k=1 ... N is the channel number and j=0 ... n−1 are the multiples of the shift L/n. If the signal does not drop at the edge of the detector, the last individual channel of the detector can be covered or masked (cut out), shown in gray in FIG. 10, in such a way that only the width of L/n is available for measurement. This is necessary for preventing artifacts when calculating.

For calculating N times n spectral values $S_m$, sums of individual channels are subtracted according to the following algorithm:

$$S_1 = c'_{1,0} = \sum_{i=1}^{N} c_{i,0} - \sum_{i=1}^{N-1} c_{i,1}$$

$$S_2 = c'_{1,1} = \sum_{i=1}^{N} c_{i,1} - \sum_{i=1}^{N-1} c_{i,2}$$

...

$$S_{n-1} = c'_{1,n-2} = \sum_{i=1}^{N} c_{i,n-2} - \sum_{i=1}^{N-1} c_{i,n-1}$$

$$S_n = c'_{1,n-1} = \sum_{i=1}^{N-1} c_{i,n-1} - \sum_{i=2}^{N} c_{i,0} - \sum_{m=1}^{n-2} c_{N,m}$$

...

$$S_{k \cdot n+1} = c'_{k,0} = \sum_{i=k}^{N} c_{i,0} - \sum_{i=k}^{N-1} c_{i,1}$$

$$S_{k \cdot n+2} = c'_{k,1} = \sum_{i=k}^{N} c_{i,1} - \sum_{i=k}^{N-1} c_{i,2}$$

...

$$S_{k \cdot n+j+1} = c'_{k,j} = \sum_{i=k}^{N} c_{i,j} - \sum_{i=k}^{N-1} c_{i,j+1}$$

...

$$S_{(k+1) \cdot n-1} = c'_{k,n-2} = \sum_{i=k}^{N} c_{i,n-2} - \sum_{i=k}^{N-1} c_{i,n-1}$$

$$S_{(k+1) \cdot n} = c'_{k,n-1} = \sum_{i=k}^{N-1} c_{i,n-1} - \sum_{i=k+1}^{N-1} c_{i,0} - \sum_{m=i}^{n-2} c_{N,m}$$

...

$$S_{N \cdot n - n} = C'_{N,0} = C_{N,0}$$

$$S_{N \cdot n - n + 1} = C'_{N,1} = C_{N,1}$$

...

$$S_{N \cdot n} = C'_{N,n-1} = C_{N,n-1}$$

The spectral values and position values S (intermediate values) calculated in this way can subsequently be represented graphically on the displayed image, e.g., during a spectral scan.

Figure 11:
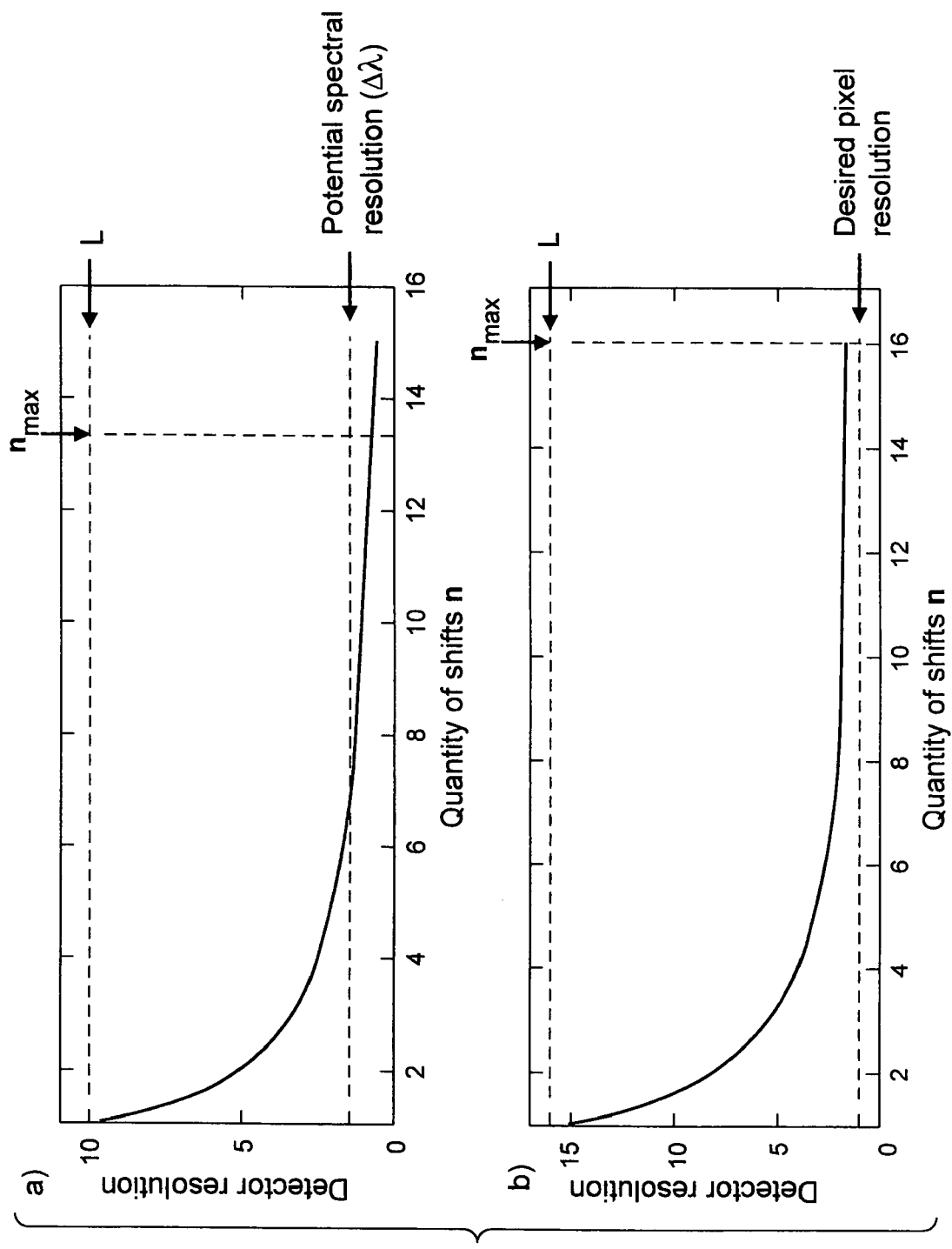
FIGS. 11a and 11b graphically shows potential spectral resolution and desired pixel resolution respectively.

FIG. 11a shows the dependency of the detector resolution on the quantity of shifts n with reference to the spectrometer arrangement described above. For n=1, the spectral resolution of the detection unit is equal to the spectral resolution of an individual channel (L), that is, approximately 10 nm. The spectral resolution of the detection unit is 2 nm for a 5-times wavelength shift by L/5. The maximum spectral resolution that can be achieved is determined by the quantity of lines of the grating that is used. This maximum spectral resolution ($\Delta\lambda$) is reached according to the Nyquist sampling theorem precisely when the detector resolution is equal to half the potential resolution of the spectrometer arrangement ($\Delta\lambda$). This corresponds to a quantity as follows:

$$n_{max} = 2 \cdot \frac{L}{\Delta\lambda}$$

and in this case is $n_{max}=13$. When the quantity of shifts is greater than $n_{max}$, the spectral components are sampled too often and there is no further increase in resolution. When n is less than $n_{max}$, too few spectral components are sampled and the resolution of the detection unit is determined by the detector.

FIG. 11b shows the dependence of the spatial resolution of the detector upon the quantity of shifts. It will be seen that the resolution achieved with a 16-times position shift in a line scanner and a 32-channel detector is the same as the resolution achieved when using a line detector with 512 image points. The image acquisition rate was increased by a factor of 32 compared to the point scanner with the same image size and a constant integration time per image point.

Figure 12:
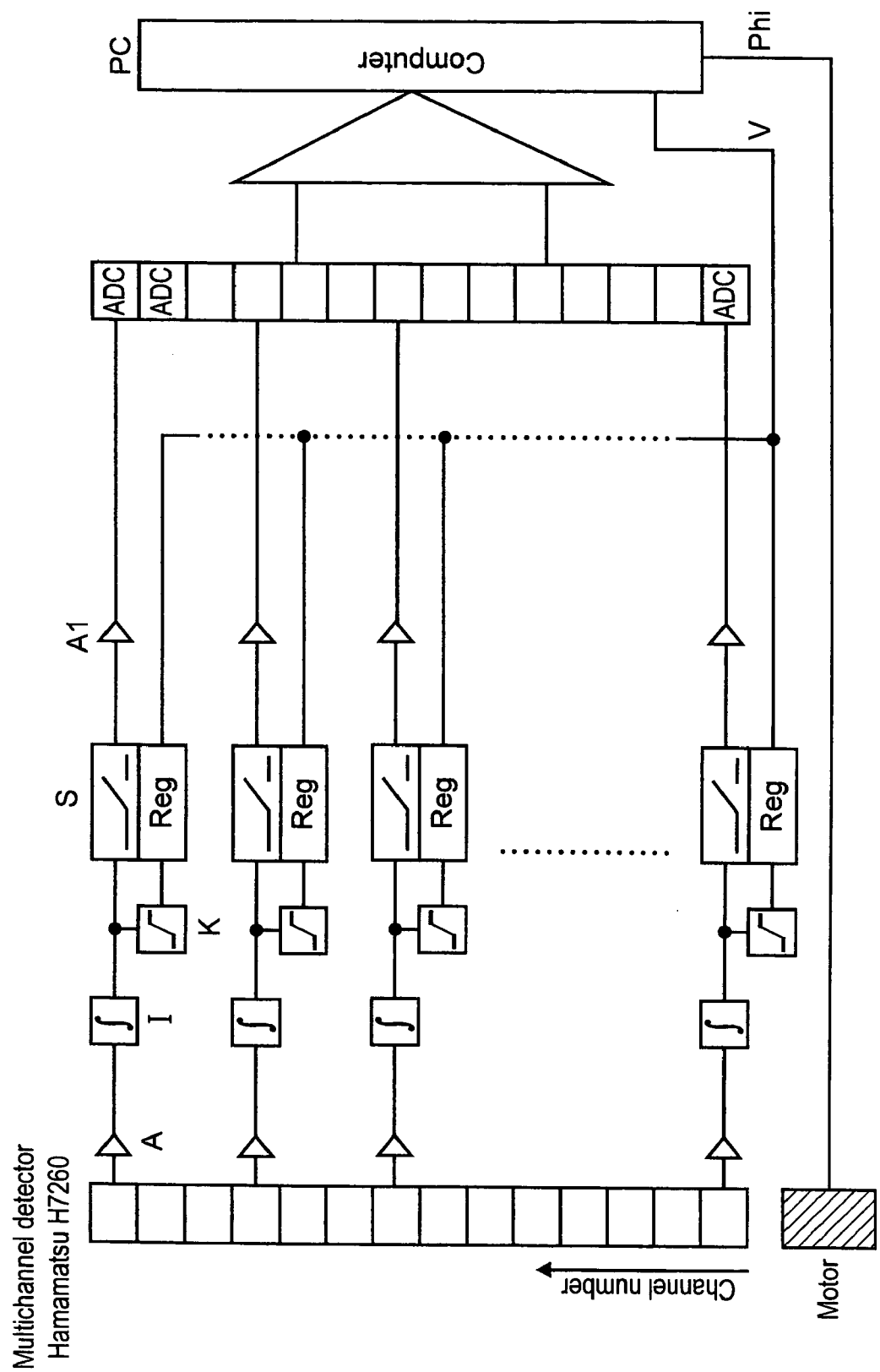
FIG. 12 illustrates a block diagram example for construction of electronics.

An arrangement for reading out the individual channels $c_{k,i}$ as a function of the rotational angle phi of the grating or mirror is shown schematically in FIG. 12. In this case, the current at the anode of the PMT is converted to voltage and amplified through the first amplifier A (connected as current-voltage converter). The voltage is fed to an integrator I which integrates the signal over a corresponding time (e.g., pixel dwell time).

For faster evaluation, the integrator I can be followed by a comparator K which, as a simple comparator, has a switching threshold such that a digital output signal is generated when this threshold is exceeded or which is constructed as a window comparator and then forms a digital output signal when the input signal lies between the upper and lower switching threshold or when the input signal lies outside (below or above) the switching thresholds. The comparator or window comparator can be arranged before as well as after the integrator. Circuit arrangements without an integrator (so-called amplifier mode) are also possible. With the amplifier mode arrangement, the comparator K is also arranged after corresponding level matching. The output of the comparator K serves as a control signal for a switch register Reg which directly switches the active channels (online), or the state is conveyed to the computer via an additional connection V in order to make an individual selection of active channels (offline). The output signal of the integrator I is fed directly to another amplifier A1 for level matching for the subsequent analog-to-digital conversion ADC. The A-D-converted values are transferred via suitable data transfer to a computer (PC or digital signal processor DSP).

A change in the rotational angle phi or of the displacement d1 can be carried out imagewise after the recording or during the scanning of an image point or image line or image column. The mechanical requirements for the scanning speed of the wavelength scanner or position scanner (WS) depend on the type of adjustment of the rotational angle. If an image-point type increase in spectral or spatial detector resolution is carried out, for example, the scan must be carried out within the integration period for this image point (that is, in several microseconds). When the increase in detector resolution is carried out imagewise, the scan must be carried out within several millisecond to seconds. The sequence of adjustment of the rotational angle can be carried out, for example, with a 5-times shift, in the sequence j=0, 2, 4, 3, 1. In this case, there is a shift by j*L/5 (with respect to the initial position for j=0). This sequence has the advantage that intermediate values can be calculated and displayed already after the recording of the individual channels for j=0, 2 and 4. The remaining individual channels are then measured for j=1,3 and the rest of the intermediate values are calculated and the resolution of the measured curve is accordingly further refined in a stepwise manner.

In another arrangement according to FIG. 12, a manipulation or distortion of the input signals of the individual detection channels is carried out by means of a change in the gain or amplification of (A), a change in the integration times of (I), by inputting an additional offset before the integrator and/or by digital influence on the counted photons in a photon counting arrangement.

In the arrangement described above, an integrator circuit was used to detect the individual channel signals. However, photon counting can also be carried out in the individual channels without limitation.

The above-mentioned line detector or matrix detector by Hamamatsu has webs or crosspieces with a width of 0.2 mm between the adjoining individual channels. These crosspieces have a negative effect on the calculation algorithm and on the efficiency of the detection device. To prevent this effect, a microlens array according to the prior art can be arranged in front of the line detector or matrix detector. In addition, this lens array focuses the arriving light on the active areas (individual channels) of the line detector or matrix detector. Further, crosstalk between adjoining individual channels is minimized.

Figure 1:
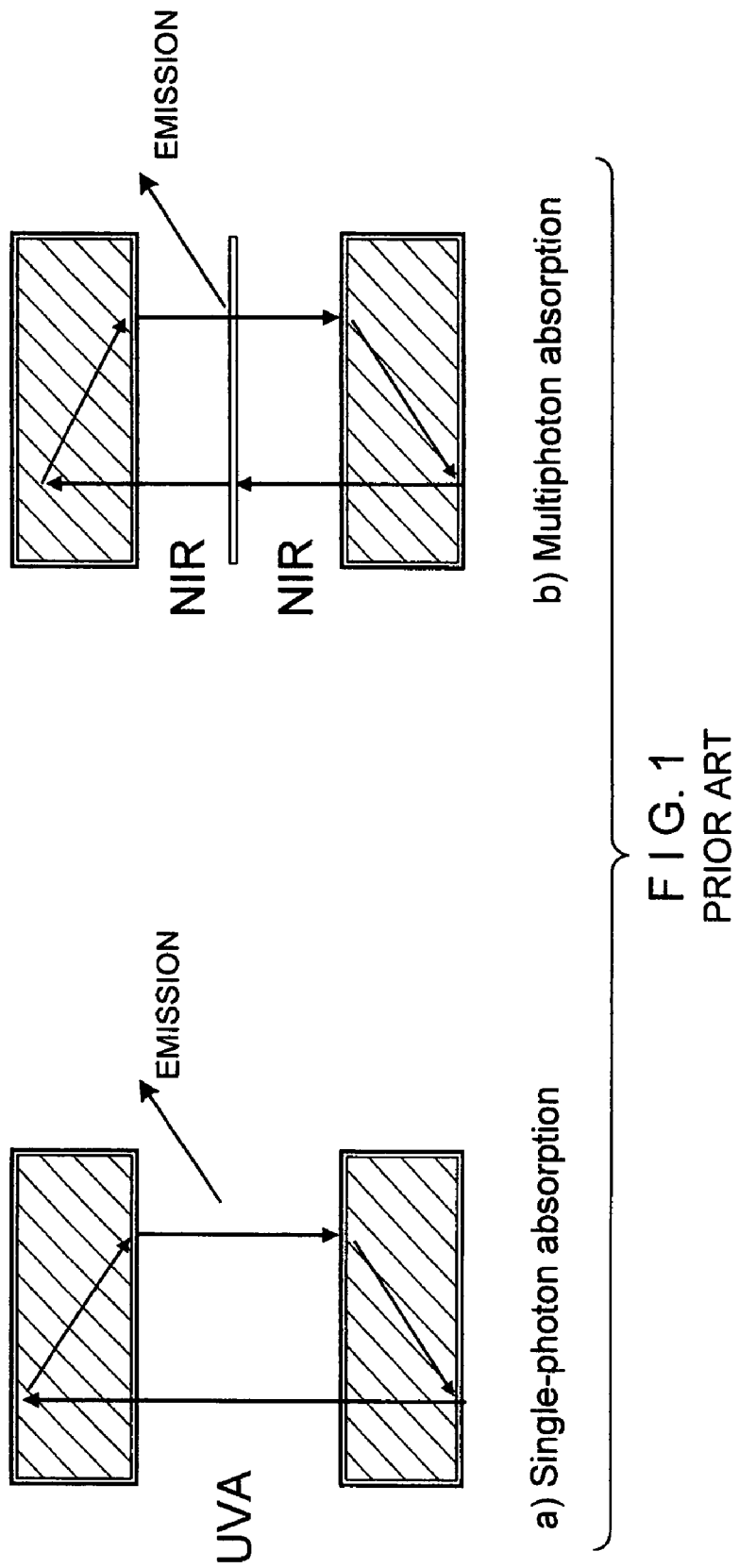
FIG. 1a illustrates one-photon absorption of a specimen.
FIG. 1b illustrates illumination of a specimen with a plurality of low energy photons producing multiphoton absorption.
Figure 13:
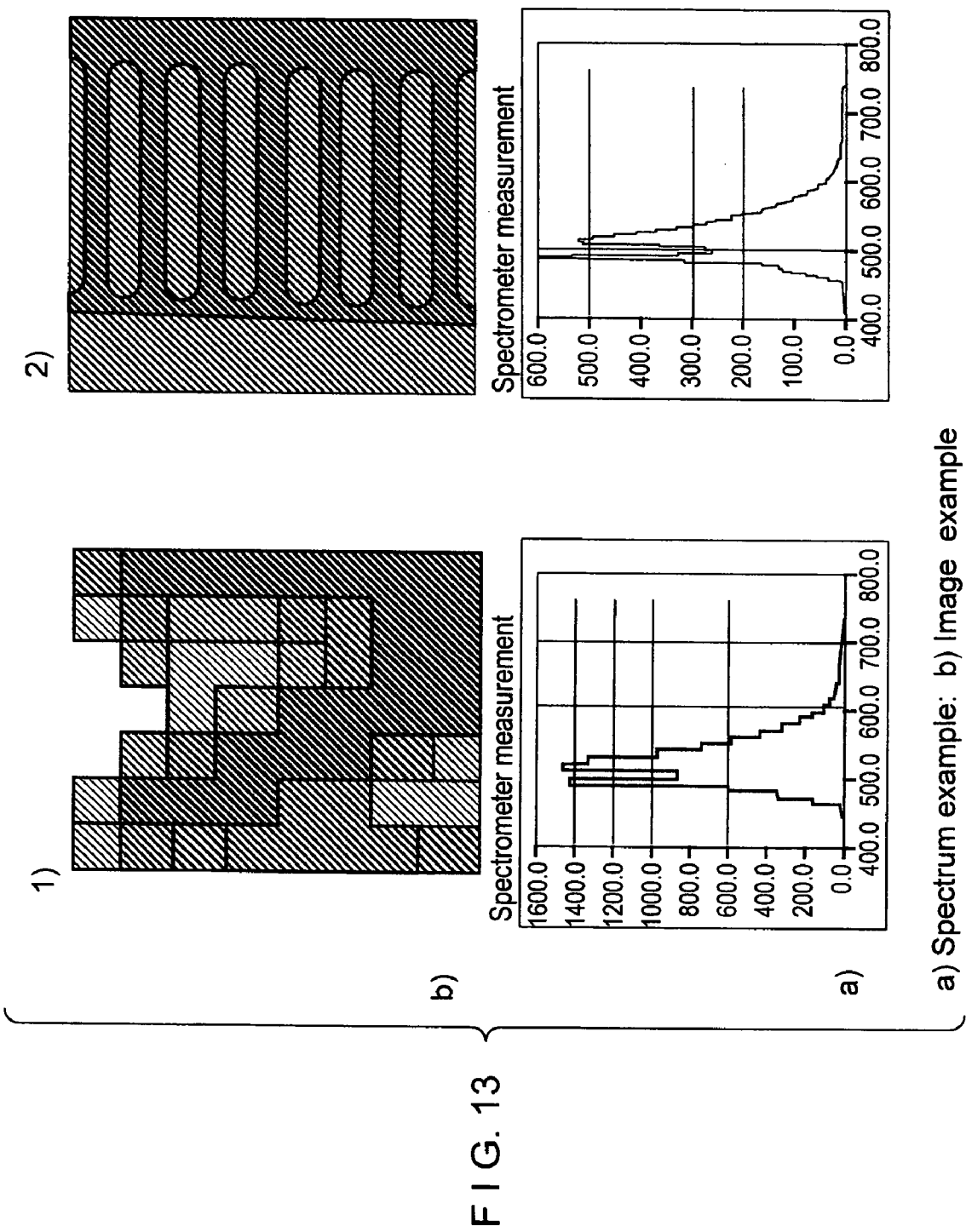
FIGS. 13a and 13b show spectrum and image examples, respectively.

FIG. 13 shows two applications of the method according to the invention. FIG. 13a 1) shows the recording of a fluorescence spectrum with the spectrometer arrangement without using the method for increasing the detector resolution. FIG. 13a 2) shows the spectrum of the identical dye, but this time using the method. The increase in spectral resolution at the separation of the laser line from the fluorescence is clearly visible.

The image of a groove grating was measured by the 32-channel detector in FIG. 13b 1). The structure of the grating can be imagined only with difficulty because of the low spatial resolution of the detector. FIG. 13b 2) shows the same image section, but this time recorded with the method for increasing the spatial resolution of the detection unit. The structures are easily distinguishable.

While the foregoing description and drawings represent the present invention, it will be obvious to those skilled in the art that various changes may be made therein without departing from the true spirit and cope of the present invention

What is claimed is:

1. A method of optical detection of characteristic quantities of an illuminated specimen, comprising:
   detecting a signal that is backscattered, reflected and/or fluoresced and/or transmitted from the specimen by a spatially resolving detector wherein radiation coming from the specimen is imaged on the detector;
   shifting a position of the radiation which is measured in a spatially resolved manner relative to the detector
   by alternately shifting a dispersive element, a scan unit and a displaceable detector;
   determining and presenting intermediate values by an algorithm from signals measured in different shifts for purposes of increasing the spatial resolution of the detector.

2. A method of optical detection of characteristic quantities of an illuminated specimen, comprising:
   detecting a signal that is backscattered, reflected and/or fluoresced and/or transmitted from the specimen by a spatially resolving detector wherein radiation coming from the specimen is imaged on the detector;
   shifting a position of the radiation which is measured in a spatially resolved manner relative to the detector
   by alternately shifting a dispersive element, a scan unit and the detector; and
   determining and presenting intermediate values by an algorithm from signals measured in different shifts for purposes of increasing the spatial resolution of the detector;
   wherein signals of detection channels are generated by at least one integrator circuit.

3. The method according to claim 1, further comprising the step of scanning with an X-Y scanner arranged in an illumination path.

4. An arrangement for optical detection of characteristic quantities of an illuminated specimen, comprising:
   a detector for detecting a signal that is backscattered, reflected and/or fluoresced and/or absorbed from the specimen, said detector being a spatially revolving detector wherein radiation coming from the specimen is imaged on the detector;
   means for imaging the signal that is backscattered, reflected and/or fluoresced and/or absorbed from the specimen, on the detector;
   means for shifting a position of the radiation which is measured in a spatially resolved manner relative to the detector
   by alternately shifting a dispersive element, a scan unit and the detector;
   means for determining and presenting intermediate values using an algorithm from signals measured in different shifts for purposes of increasing the spatial resolution of the detector.

5. An arrangement for optical detection of characteristic quantities of an illuminated specimen, comprising:
   a detector for detecting a signal that is backscattered, reflected and/or fluoresced and/or absorbed from the specimen, said detector being a spatially revolving detector wherein radiation coming from the specimen is imaged on the detector;
   means for imaging the signal that is backscattered, reflected and/or fluoresced and/or absorbed from the specimen, on the detector;
   means for shifting a position of the radiation which is measured in a spatially resolved manner relative to the detector
   by alternately shifting a dispersive element, a scan unit and the detector;
   means for determining and presenting intermediate values using an algorithm from signals measured in different shifts for purposes of increasing the spatial resolution of the detector;
   wherein signals of detection channels are generated by at least one integrator circuit.

* * * * *